(12) United States Patent
Wang et al.

(10) Patent No.: US 7,746,675 B2
(45) Date of Patent: Jun. 29, 2010

(54) ASYMMETRICAL INTERLEAVING STRATEGY FOR MULTI-CHANNEL POWER CONVERTERS

(75) Inventors: Chuanyun Wang, Blacksburg, VA (US); Ming Xu, Blacksburg, VA (US); Fred C. Lee, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 543 days.

(21) Appl. No.: 11/834,281

(22) Filed: Aug. 6, 2007

(65) Prior Publication Data

US 2008/0239771 A1 Oct. 2, 2008

Related U.S. Application Data

(60) Provisional application No. 60/896,948, filed on Mar. 26, 2007.

(51) Int. Cl.
 *H02M 1/14* (2006.01)
(52) U.S. Cl. ............... 363/44; 363/45; 363/48; 363/52; 363/69; 363/84
(58) Field of Classification Search .......... 363/44, 363/45, 46, 48, 52, 61, 67, 69, 81, 82, 84, 363/87, 108
See application file for complete search history.

(56) References Cited

U.S. PATENT DOCUMENTS

| 4,384,321 A | * | 5/1983 | Rippel ............ 363/124 |
| 6,043,997 A | * | 3/2000 | He et al. .......... 363/44 |
| 6,069,801 A | * | 5/2000 | Hodge et al. ...... 363/21.02 |
| 6,154,090 A | * | 11/2000 | Wissmach et al. .. 327/552 |

OTHER PUBLICATIONS

Elmore, "Input Current Ripple Cancellation in Synchronized, Parallel Connected Critically Continuous Boost Converters," Proceedings of the IEEE Applied Power Electronics Conference and Exposition (APEC), San Jose, CA, Mar. 3-7, 1996, pp. 152-158.*

(Continued)

*Primary Examiner*—Bao Q Vu
*Assistant Examiner*—Nguyen Tran
(74) *Attorney, Agent, or Firm*—Whitham, Curtis, Christofferson & Cook, P.C.

(57) ABSTRACT

In a power converter having m=two or more channels of power factor correction (PFC) circuits connected in parallel and an electromagnetic interference (EMI) filter connected in series therewith, phase shifts in switching between the respective PFC channels can allow increase of EMI filter corner frequency allowing reduction of size and cost of the EMI filter at some switching frequencies. Asymmetrical phase shifts (other than 360°/m) such as 360°/2m and other phase shifts and variations in m allow increase of EMI filter corner frequency at switching frequencies where symmetrical, 360°/m phase shifts provide no benefit to EMI filter design by providing cancellation or partial cancellation of different harmonics of the switching noise; which cancellation may be arranged to be complementary to the EMI filter function at more than one peak of the noise spectrum. (Such asymmetrical phase shifts do not significantly increase ripple and consequent switching noise). Alteration of m and corresponding alteration of phase shift may be performed adaptively for purposes of improving efficiency at light loads and the like.

14 Claims, 13 Drawing Sheets

OTHER PUBLICATIONS

Ishii et al., "Power Factor Correction using Interleaving Technique for Critical Mode Switching Converters," Proceedings of the IEEE Power Electronics Specialists Conference (PESC), Japan,1998, pp. 905-910.*

Irving et al., "A Comparative Study of Soft-Switched CCM Boost Rectifiers and Interleaved Variable-Frequency DCM Boost Rectifier," Proceedings of the IEEE Applied Power Electronics Conference (APEC), Feb. 2000, 7 pages.*

Zhang et al., "Evaluation of Input Current in the Critical Mode Boost PFC Converter for Distributed Power Systems," Proceedings of the IEEE Applied Power Electronics Conference(APEC), Feb. 2001, pp. 130-136.*

* cited by examiner

Filter Attenuation

ASYMMETRICAL INTERLEAVING STRATEGY FOR MULTI-CHANNEL POWER CONVERTERS

CROSS-REFERENCE TO RELATED APPLICATIONS

This application claims priority of U.S. Provisional Patent Application 60/896,948, filed Mar. 26, 2007, which is hereby fully incorporated by reference.

BACKGROUND OF THE INVENTION

1. Field of the Invention

The present invention generally relates to AC to DC power converters and, more particularly, to design strategy for increasing power density of such power converters through reduction of electromagnetic interference (EMI) filter size in such power converters.

2. Description of the Prior Art

The great preponderance of electrical and electronic devices currently in use contain circuitry which is designed to operate using direct current (DC) power while, for reasons of distribution efficiency, most power is ultimately delivered to such devices as alternating current (AC) power. Therefore, many electrical and electronic devices include power converters to develop DC power at a desired voltage from distributed AC power. Such power converters are currently required to include circuitry which provides power factor correction (PFC) and prevents the device from causing electromagnetic interference noise from propagating from the device or power converter to the AC power distribution system in order to preserve the quality of the AC power and to prevent propagation of noise between devices connected to the AC power distribution system. The EMI filter also serves to protect powered devices from EMI noise which may be present on the AC power distribution network.

In high power applications, paralleling of devices (e.g. active and passive components) in power converters is virtually inevitable in order to handle and deliver large currents which are often required. However, it is often the practice to provide power converters in parallel (often referred to as a modular approach to overall power converter design) rather than connecting the individual, respective components thereof in parallel in a single power converter. A modular approach is considered to be more effective than connecting individual components in parallel since it allows control of current sharing between the parallel connected power converters and can be effective to reduce ripple in the DC output voltage which, in turn, can reduce the size and cost of output filter arrangements. Accordingly, a modular approach is widely used in all types of distributed power systems such as data server and telecommunications applications.

In such modular power converters, an EMI filter and PFC circuit is built into the front-end power converter module. Accordingly, the size and cost of EMI filters and PFC circuits is significant, particularly in the aggregate over large numbers of power converters. However, when plural power converters are used in parallel to supply adequate power for a single device or a plurality of devices proximate to a single location or to each other (e.g. as in a vehicle), the PFC circuits can be operated in multiple interleaved channels equally separated in time (with the phase separation being 360°/m where m is the number of channels, generally referred to hereinafter as symmetrical); allowing a single EMI filter to be connected in common to all channels. By doing so, the EMI filter size can, in some cases, be reduced due to ripple cancellation effects in the converter or power factor correction (PFC) circuit which reduce the magnitude of differential mode (DM) EMI noise. It is also possible to connect PFC circuits in parallel such that the number of PFC circuits required is different from the number of DC/DC power converters that may be required in a given application. Another benefit of interleaved channels is that the ripple frequency is increased in frequency by a factor equal to the number of channels employed. In some cases, this increase in ripple frequency increases the "corner frequency" (e.g. the nominal frequency of the low pass attenuation) of the EMI filter, allowing smaller components to be used in the EMI filter although there is a trade-off between the size and cost of the EMI filter and the size, cost and number of the PFC channels that may be used. Thus, the size and cost reduction in EMI filters achieved through operation in symmetrical interleaved channels is quite limited and size and cost remains significant at the present state of the art.

SUMMARY OF THE INVENTION

It is therefore an object of the present invention to provide an approach to design of AC to DC power converters and PFC circuit arrangements, in particular, which allows size and cost of EMI filters to be reduced beyond current practical limitations.

In order to accomplish this and other objects of the invention, a method of determining parameters of a power factor correction circuit to allow an EMI filter for said power factor correction circuit to have an increased corner frequency is provided comprising steps of determining a minimum noise frequency of interest, determining a switching frequency of the power factor correction circuit which has m channels, where m is equal to two or more that are operated in an interleaved manner in which switching times in respective channels of the power factor correction circuit are separated by a phase shift, selecting a phase shift other than 360°/m such that a fundamental frequency or an initial harmonic having a frequency above said minimum noise frequency of interest is at least partially canceled, and selecting a corner frequency of an EMI filter based on a next higher order harmonic frequency above the fundamental frequency or initial harmonic having a frequency above the minimum noise frequency of interest.

In accordance with another aspect of the invention, a power converter circuit is provided including a multi-channel power factor correction circuit having m power factor correction circuit modules connected in parallel as respective channels thereof, respective channels of the power factor correction circuit including switching with a relative phase shift other than 360°/m such that a fundamental frequency or initial harmonic of switching noise above a frequency of interest is at least partially canceled, and an electromagnetic interference (EMI) filter having a corner frequency chosen based upon a harmonic of said switching noise having a frequency above the a fundamental frequency or initial harmonic of switching noise above a frequency of interest.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
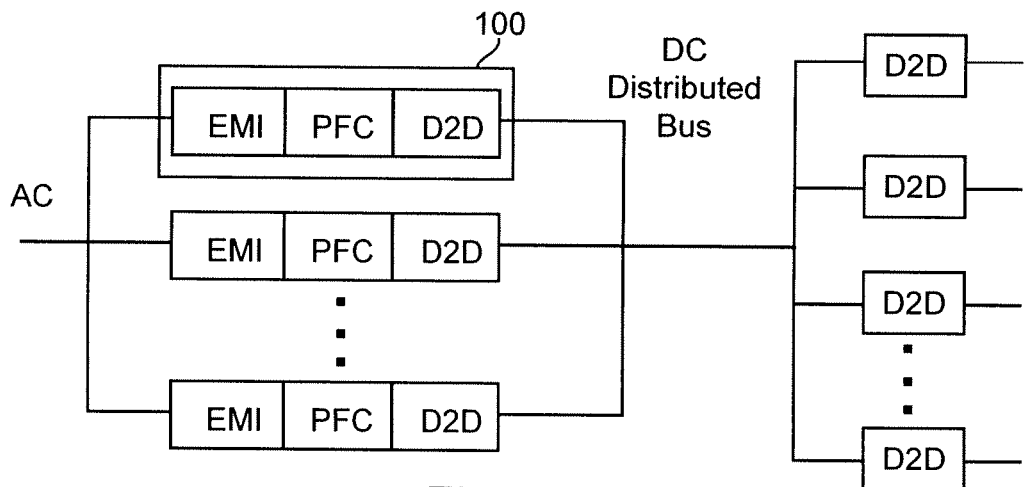
FIG. 1 is a diagram illustrating an architecture of a distributed power system.
Figure 2:
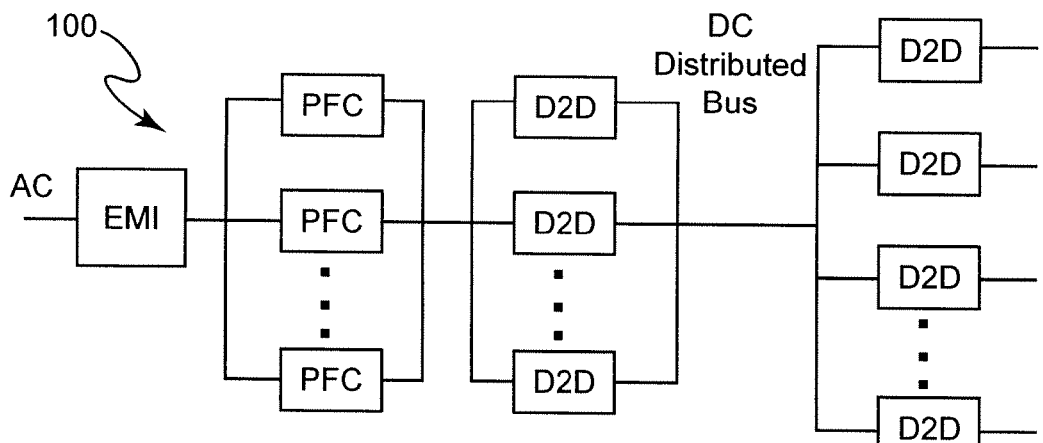
FIG. 2 is a diagram of a multi-channel power converter system.

Referring now to the drawings, and more particularly to FIG. 1, there is shown a representation of an architecture of a distributed power system having an alternating current (AC) input, a plurality of independent branches, each comprising an EMI filter, a power factor correction circuit generally providing a regulated direct current (DC) output and a DC to DC power converter (labeled "D2D"), and a common distributed DC output bus to which loads may be connected at any point of the distributed system. Such an architecture would generally be employed with a branch such as that indicated by line 100 proximate to each of a plurality of loads which may be spatially distributed. The actual architecture and circuitry of each branch may vary as may be dictated by the requirements of an associated load and may involve a multi-channel arrangement such as is depicted in FIG. 2.

In the exemplary arrangement of FIG. 2, a plurality of DC to DC (hereinafter sometimes referred to as D2D) power converters may be employed in order to provide required current and limitation of ripple voltage which may be achieved by switching the power converters in an interleaved manner as alluded to above. A plurality of power factor correction (PFC) circuits are also provided to meet current and ripple voltage requirements but need not be equal in number to the number of power converters that may be required. In general, it is desirable for a common bus connection to be provided between the PFC and D2D circuits. It is important to note, however, that only one EMI filter is required, regardless of the number of PFC and D2D circuits which may be employed. However, the EMI filter must be able to suitably attenuate noise at frequencies which may be of interest under any applicable EMI standard which, in the following discussion, will be generally taken as frequencies of 150 KHz and above.

It is assumed for purposes of the following discussion of the invention that the D2D power converter circuits and the PFC circuits are constituted by switched converters where the duty cycle of input current is switched in order to develop a desired regulated voltage. Since the input power is generally provided by an AC voltage source at a frequency much less than the switching frequency, the duty cycle of switching of the PFC will generally vary cyclically with the AC voltage amplitude.

It is further assumed that the switching will be performed in an interleaved fashion. As alluded to above, interleaving of switching, particularly if symmetrical (e.g. having an equal phase separation between channels), will reduce the ripple current at the input of PFC circuits and thus will reduce the DM EMI noise magnitude which can result in a reduction of the required size of the EMI filter. More importantly, however, by interleaving the switching of a plurality, m, of channels, the ripple current frequency will be increased by a factor of m. A higher frequency of the input ripple current implies that the DM EMI noise frequency is similarly increased; allowing a higher (differential mode, DM) EMI filter corner frequency which, as is known, can be realized with inductance and capacitance of lower value and smaller size which increases overall power density of the power converter. (Differential mode (DM) noise filtering is indicated here since common mode noise has not yet been discussed. In general, common mode noise can be predicted but only with substantially greater difficulty than DM noise. As will be discussed below, however, for purposes of the invention, CM noise and DM noise relate to the invention quite similarly and thus, the same technique an be applied for both DM and CM noise considered in the design thereof). The invention, as will be described below, provides a design strategy which optimally exploits these effects for maximal size and cost reduction of EMI filters for PFC power converters.

Figure 3:
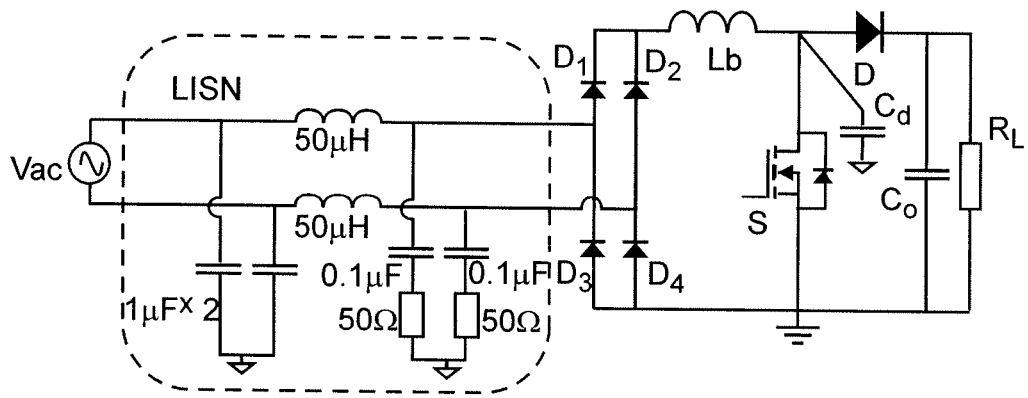
FIG. 3 is a schematic diagram of a typical single channel power factor corrected power converter with a line impedance stabilization network (LISN)
Figure 4:
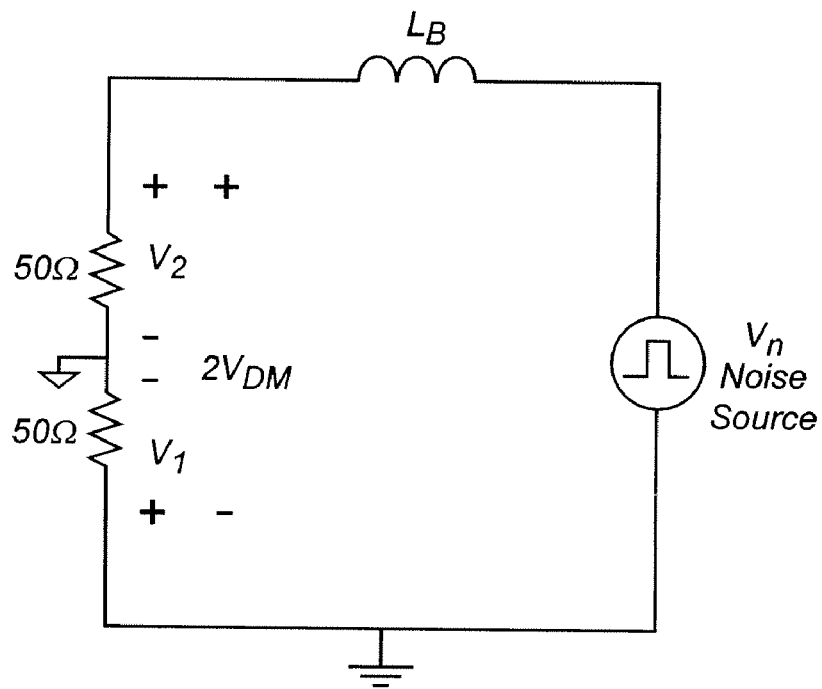
FIG. 4 is a simplified schematic diagram of a model for conducted differential mode (DM) noise based on the circuit of FIG. 3.

To assist in conveying an understanding of the basic principles of the invention, an exemplary conventional single channel power factor correction (PFC) circuit with continuous conduction mode (CCM) operation is illustrated in FIG. 3 in combination with a line impedance stabilization network (LISN) circuit which will be familiar to those skilled in the art as a network defined by EMI standards such as EM55022B and inserted at the input side of a circuit (in this case, a PFC circuit constituted by, for example, a boost converter although the invention is equally applicable to other switched PFC circuits and power converter circuits) for EMI noise measurement. The LISN circuit does not provide an EMI filter function and is not part of the PFC circuit. The load, $R_L$, illustrated represents a load such as, in this case, one or more D2D converter circuits. The diode bridge, D1, D2, D3, D4 can be considered as a short circuit for the EMI noise because (if the cross-over point is ignored) there is always one pair of diodes conducting. Because of the switching of MOSFET, S, voltage across the MOSFET drain to source is a voltage pulse which pulsates from 0V to the output voltage (generally 400V). Therefore the MOSFET S, diode D and output circuit (constituted by filter capacitor $C_o$) can be modeled by a pulse voltage $V_o$ which is the source of both DM and CM noise. For the conduction EMI frequency range from 150 KHz to 30 MHz of interest (e.g. bounding the switching frequencies considered practical to employ as well as the frequencies of interest under current EMI standards), the two 0.1 μF capacitors can be ignored due to their small impedance compared with the two 50Ω LISN resistors. Thus, the simplified conducted DM noise model is shown in FIG. 4, wherein $L_B$ is the boost PFC inductor and $V_n$ is the noise source.

Figure 5:
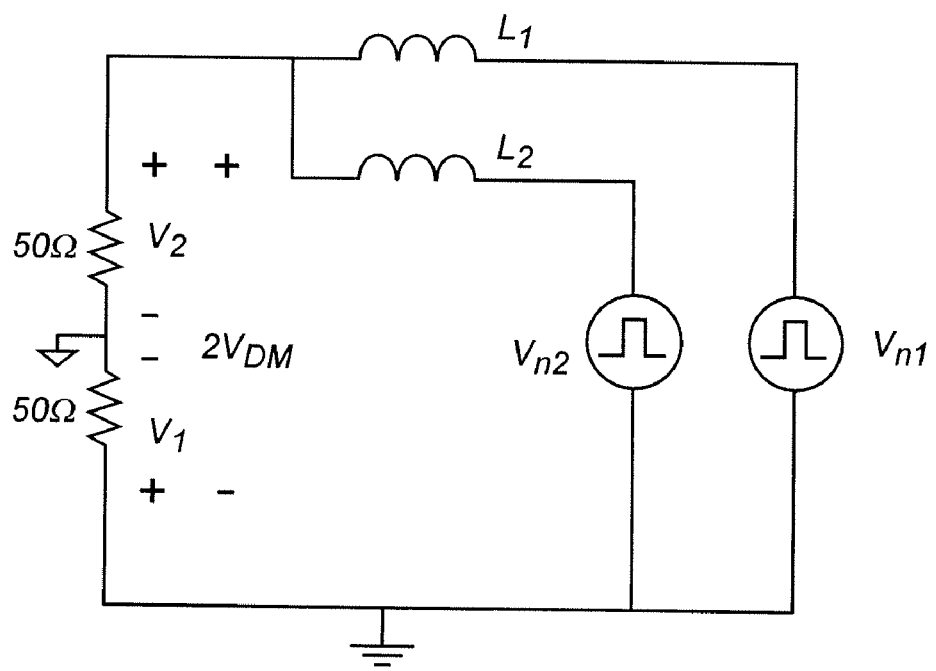
FIG. 5 is a similarly simplified DM noise model for a two-channel interleaved power converter.
Figure 6:
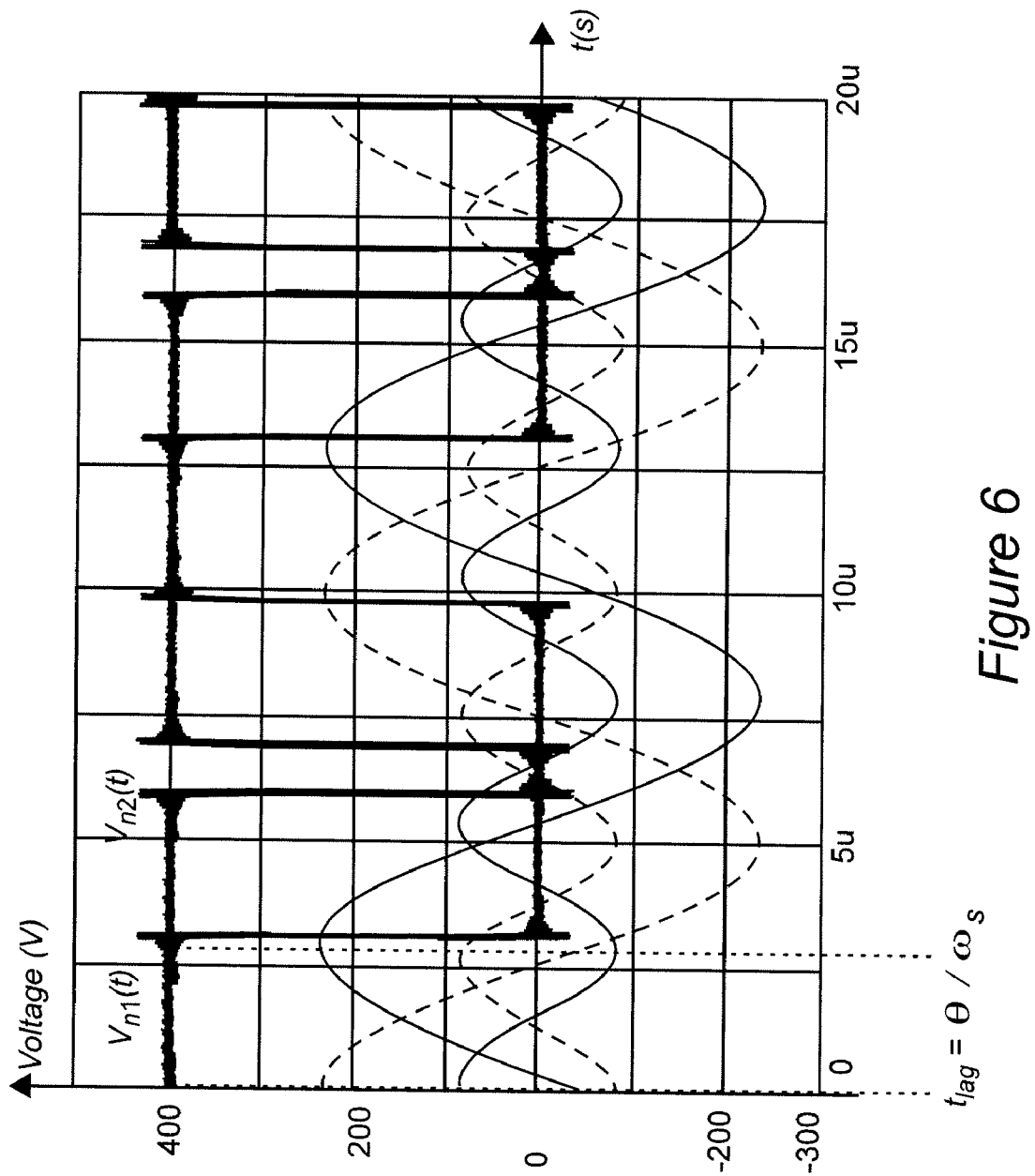
FIG. 6 is a corresponding graph of the two noise sources and their harmonics.

Following the same type of analysis and modeling, a two-channel interleaved PFC converter DM noise model is illustrated in FIG. 5 wherein $L_1$ and $L_2$ are the boost inductors of the two interleaved channels and $V_{n1}$ and $V_{n2}$ are the respective noise sources. The two noise sources of two paralleled channels are shown in FIG. 6, $v_{n1}(t)$ and $v_{n2}(t)$. Assume the phase shift between the two channels is θ. Using Fourier Series the following equations (1) and (2) represent the noise sources. where d is the duty cycle, Vo is the output voltage. For the nth order harmonic, the phase difference between two channels is nθ. For the two-channel symmetrical interleaving PFC, the phase shift angle, θ, is equal to 180° (e.g. 360°/2). For the switching frequency component, based on the DM noise model discussed above, the DM noise magnitude, $V_{DM}$, can be solved. Assuming the same impedance of the circuit of the models of FIGS. 4 and 5 and the same absolute magnitude of noise voltage pulses, the time domain waveforms of the two respective branches of FIG. 5 at the fundamental frequency (e.g. equal to the switching frequency) are shown in graph (a) of FIG. 7. Because of symmetrical interleaving (which is assumed in this example), they are out of phase by 180° (e.g. 360°/2) and cancel each other. Thus there is no switching (e.g. fundamental) frequency DM noise for the 180° interleaved two-channel PFC converter circuit. Specifically, $$|\vec{V}_{DM}^{(1)}| = \left| \frac{R_{LISN}(Z_{L2}\vec{V}_{n1}^{(1)} + Z_{L1}\vec{V}_{n2}^{(1)})}{Z_{L1}Z_{L2} + 2R_{LISN}Z_{L1} + 2R_{LISN}Z_{L2}} \right| \quad (3)$$

$$= \left| \frac{R_{LISN}(\vec{V}_{n1}^{(1)} + \vec{V}_{n2}^{(1)})}{Z_L + 4R_{LISN}} \right|$$

$$= 0$$

Figure 7A:
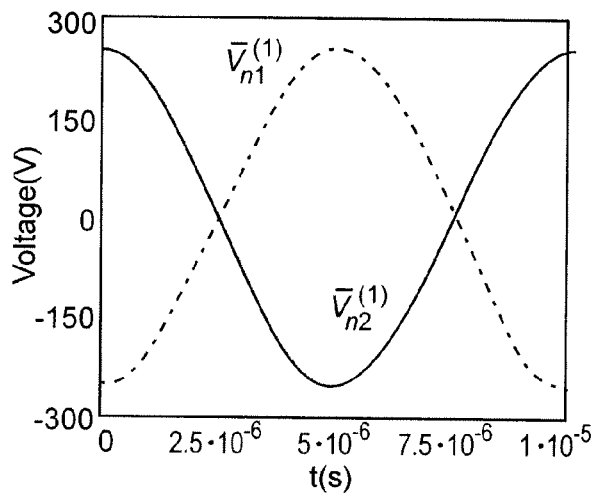
FIG. 7 illustrates time domain waveforms useful in understanding basic principles of the invention.
Figure 7B:
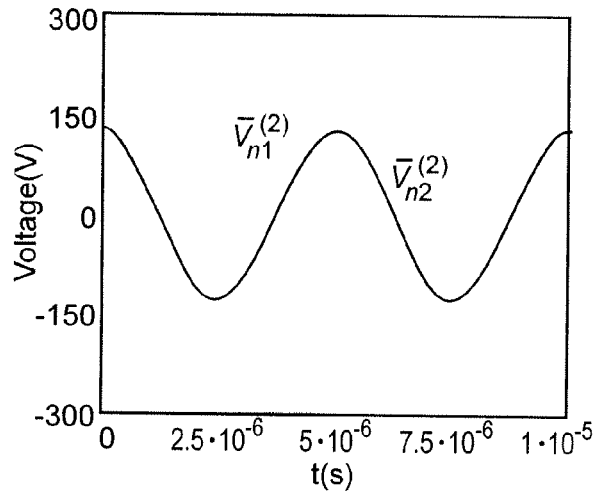
Figure 7C:
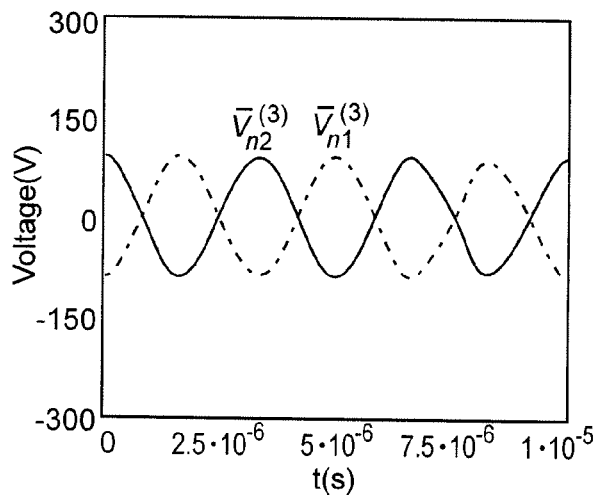

However, for the second order harmonic, the same delay time between interleaved pulses will place the noise pulses in phase as shown in graph (b) of FIG. 7 and will reinforce each other. (For non-interleaving multi-channel PFCs, all the harmonics will be reinforced. For a single channel PFC, all the harmonics are equivalent to the reinforced harmonics to smaller impedance of $L_B$). Thus the DM noise as the second order harmonic will be $$|\vec{V}_{DM}^{(2)}| = \left| \frac{R_{LISN}(Z_{L2}\vec{V}_{n1}^{(2)} + Z_{L1}\vec{V}_{n2}^{(2)})}{Z_{L1}Z_{L2} + 2R_{LISN}Z_{L1} + 2R_{LISN}Z_{L2}} \right| \quad (4)$$

$$= \left| \frac{R_{LISN}(\vec{V}_{n1}^{(2)} + \vec{V}_{n2}^{(2)})}{Z_L + 4R_{LISN}} \right|$$

$$= \left| \frac{2R_{LISN}\vec{V}_n^{(2)}}{Z_L + 4R_{LISN}} \right|$$

For the third order harmonic, as shown in graph (c) of FIG. 7, the noise will again be cancelled in the same manner as for the fundamental frequency. Likewise, for the fourth order harmonic the waveforms of the respective channels will be in phase and reinforce each other (but without increase of the amplitude of the noise peak), and so on. Thus, for a 180° interleaved (symmetrical) two-channel PFC converter, the odd harmonics are cancelled and only the even numbered harmonics exist. This DM noise model can be extended to an m-channel interleaved PFC converter (with the phase separation being 360°/m) and the differential voltage will be:

$$|\vec{V}_{DM}^{(n)}| = \begin{cases} 0 & n = 1, m+1, 2m+1 \ldots \\ 0 & n = 2, m+2, 2m+2 \ldots \\ \cdots \\ \left| \frac{mR_{LISN}\vec{V}_n^{(n)}}{Z_L + 2mR_{LISN}} \right| & n = m, 2m, 3m \ldots \end{cases} \quad (5)$$

Figure 8A:
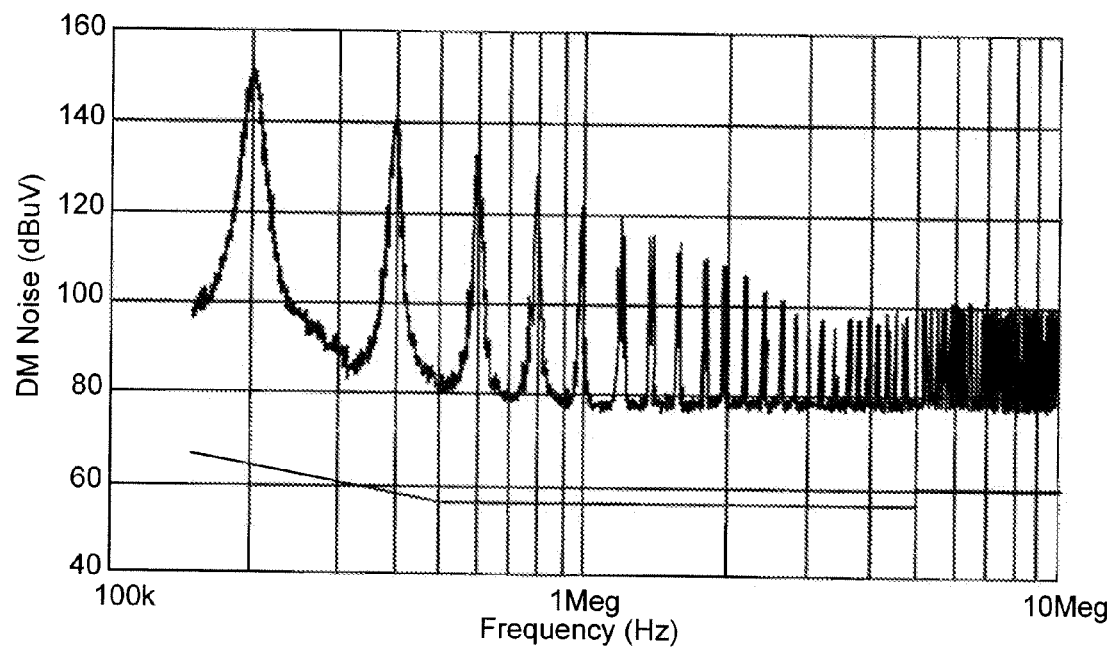
FIG. 8 illustrates measured DM noise spectra of non-interleaved and interleaved two channel power converters, respectively.
Figure 8B:
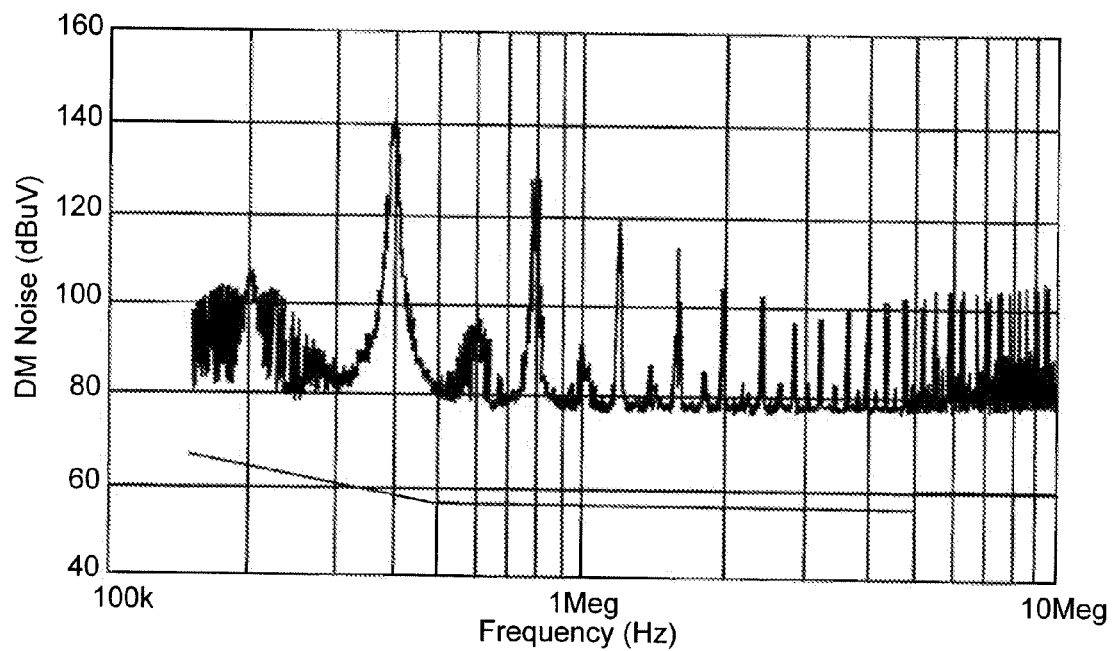

This DM noise model has been experimentally verified using a two-channel interleaved PFC converter prototype with each channel running at a 200 KHz switching frequency. By way of comparison, in a non-interleaved PFC converter, the measured first noise peak appears at the switching frequency as illustrated in graph (a) of FIG. 8. For the interleaved PFC converter, the first, third, fifth, etc. order noise was cancelled and the first DM noise peak appears at twice the switching frequency as shown in graph (b) of FIG. 8. Thus, with some significant limitations which will be discussed below, the increased frequency of the lowest DM noise component (assuming it to be of interest under the applicable EMI standard) can be easily attenuated by a smaller EMI filter with higher corner frequency than would be possible for the single channel converter or the non-interleaved plural channel converter.

Figure 9:
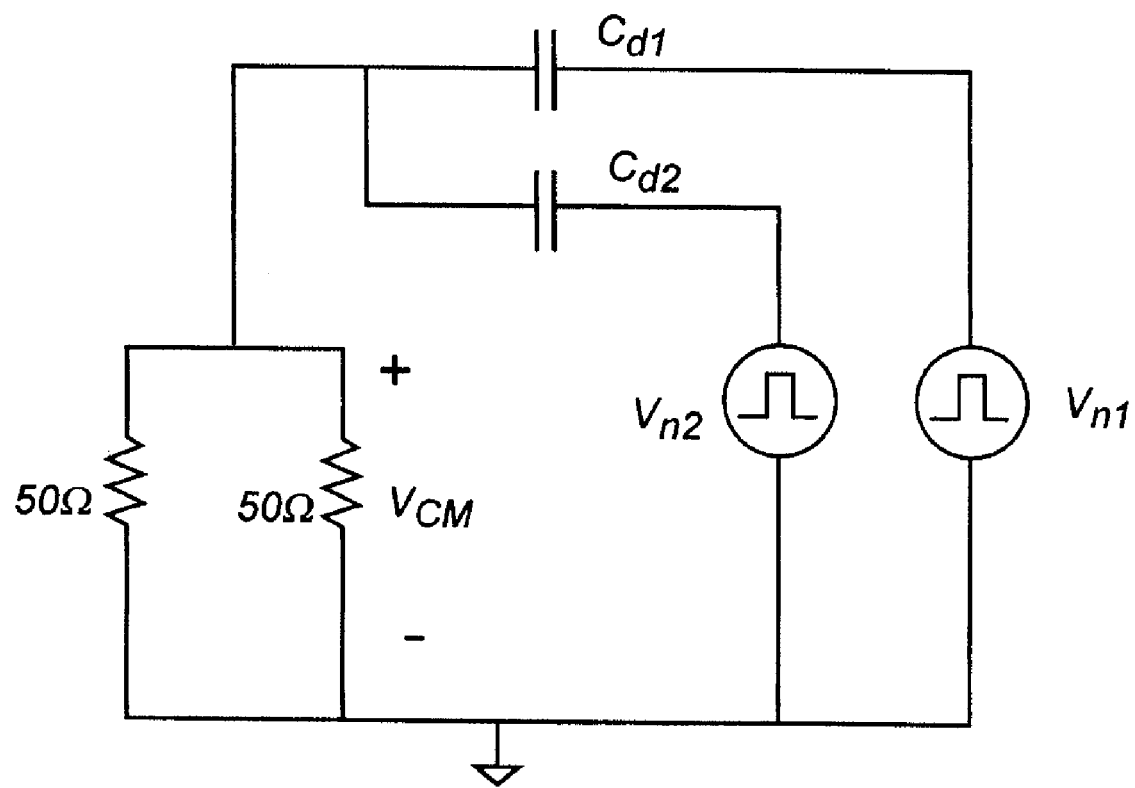
FIG. 9 is a schematic diagram of a two-channel power converter model for common mode (CM) noise.

A similar analysis for CM noise yields a similar result. A simplified conducted CM noise model for a two-channel interleaved PFC converter is shown in FIG. 9 where $C_{d1}$ and $C_{d2}$ are the parasitic capacitances between the drains of the MOSFETs and ground. The results of analysis show that for the two-channel 180° interleaved (symmetrical) PFC converter, the odd order CM noise is cancelled and only the even order CM noise peaks exist. Extended to an m-channel interleaved PFC converter, $$|\vec{V}_{DM}^{(n)}| = \begin{cases} 0 & n = 1, m+1, 2m+1 \ldots \\ 0 & n = 2, m+2, 2m+2 \ldots \\ \cdots \\ \left| \frac{mR_{LISN}\vec{V}_n^{(n)}}{Z_C + 2mR_{LISN}} \right| & n = m, 2m, 3m \ldots \end{cases} \quad (6)$$

Figure 10A:
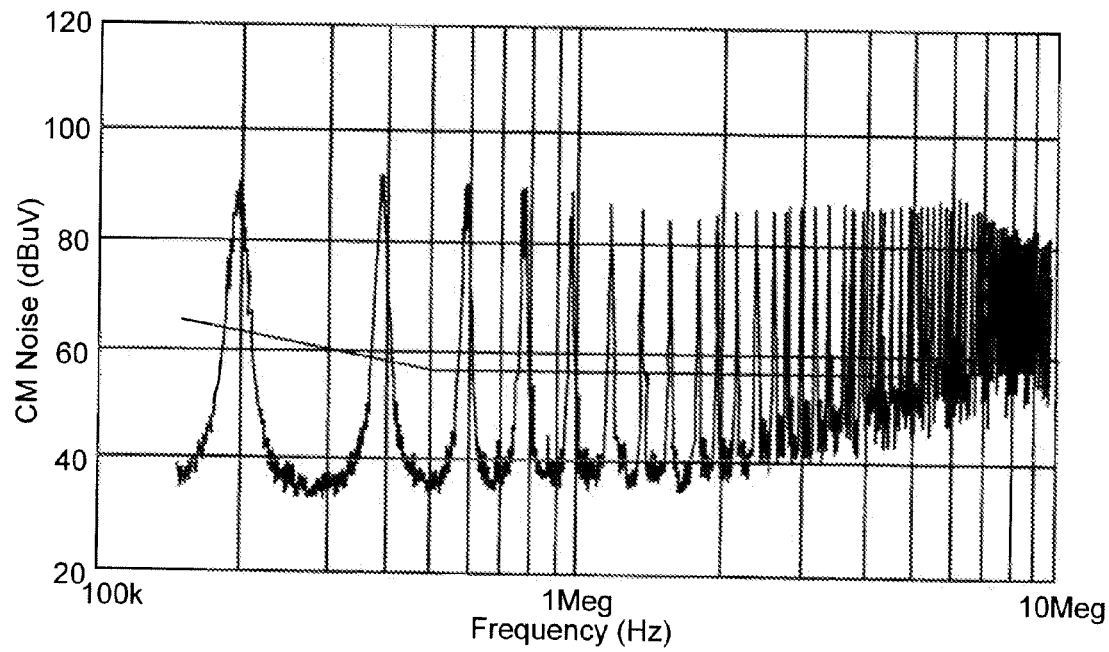
FIG. 10 illustrates measured CM noise spectra of non-interleaved and interleaved two channel power converters, respectively, FIG. 11 graphically illustrates the relationship between filter corner frequency and switching frequency, FIG. 12 illustrate a comparison of measured DM and CM noise for a single channel power converter and a two channel power converter with a symmetrical 180° phase shift between channels.
Figure 10B:
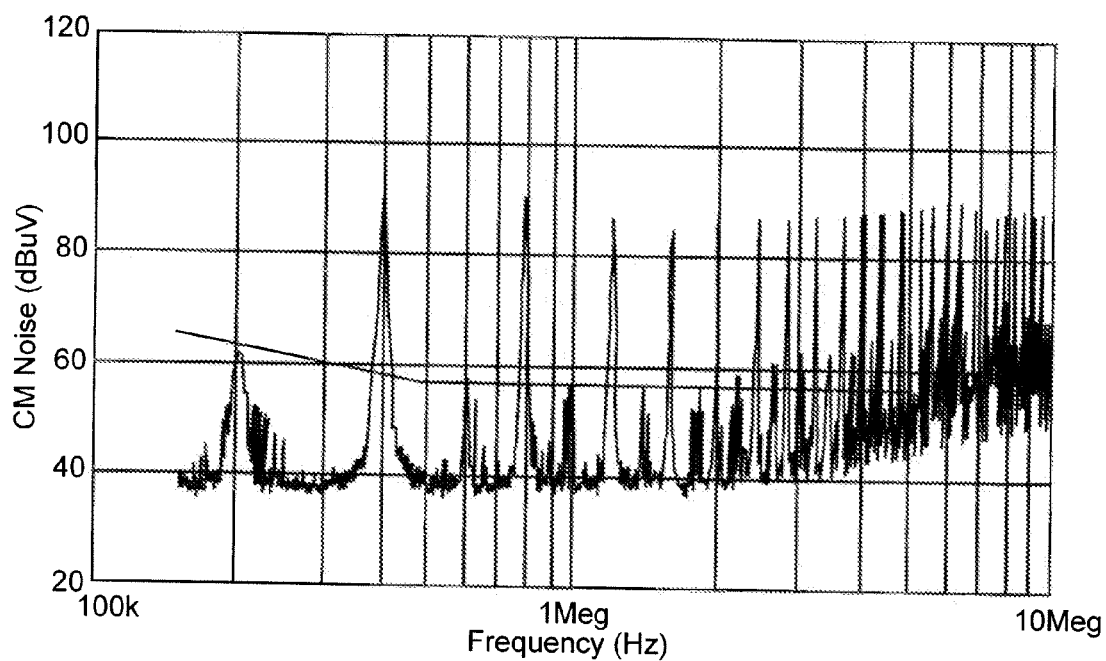

The measured CM noise for the non-interleaved and 180° interleaved (symmetrical) two-channel PFC converters are shown in graphs (a) and (b) of FIG. 10, respectively, and substantially agree with the results of the DM analysis and modeling discussed above for CM noise. Again, as with DM noise, the frequency of the first large noise peak is doubled in frequency; allowing the corner frequency of the EMI filter to be increased and the filter to be implemented with smaller and less costly components.

Figure 11A:
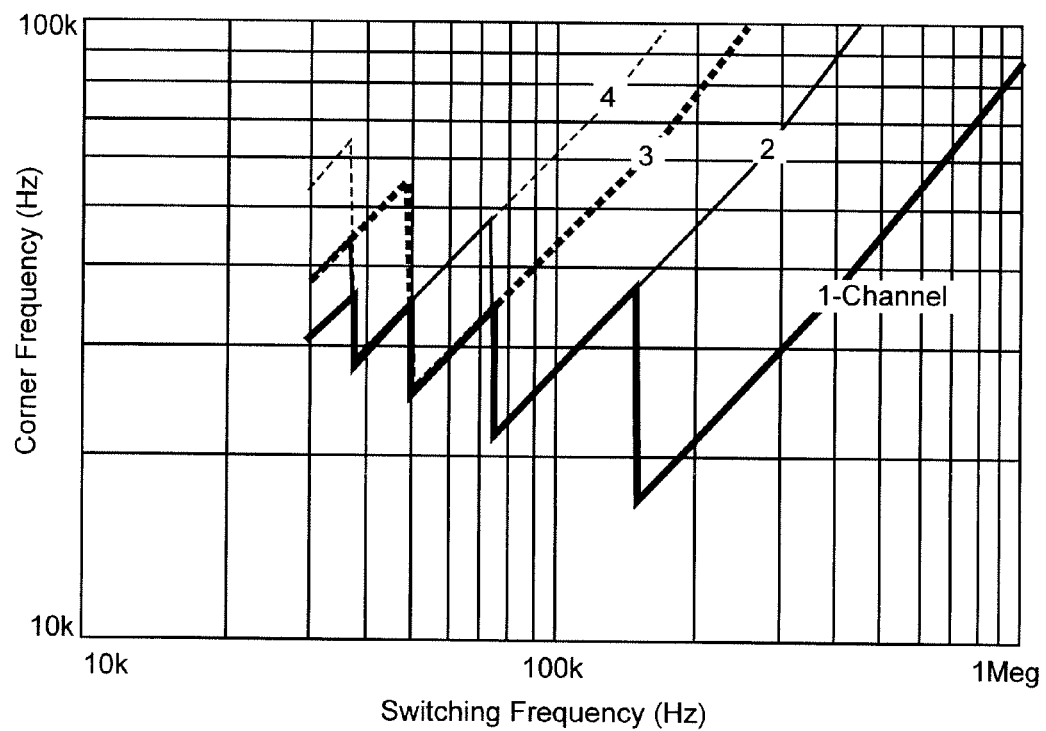
Figure 11B:
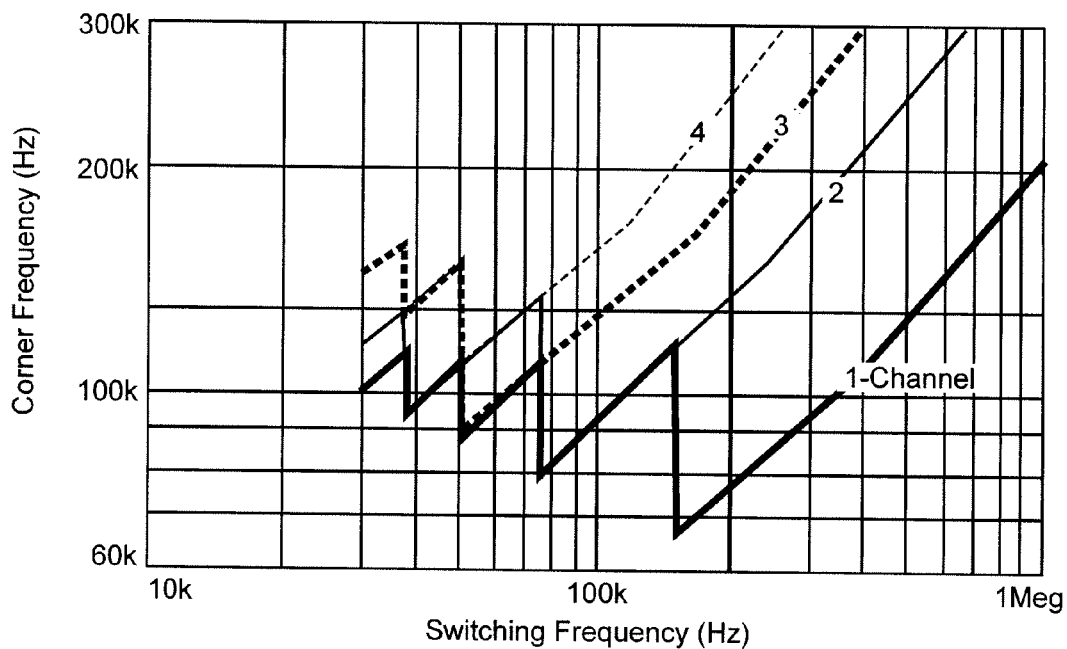
Figure 12A:
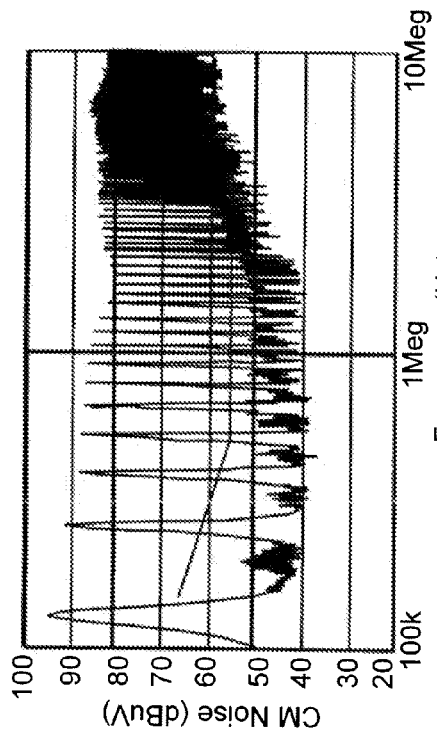
Figure 12B:
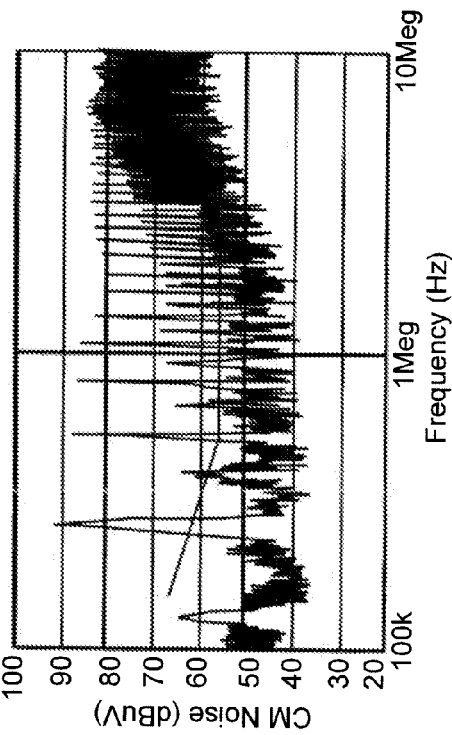
Figure 12C:
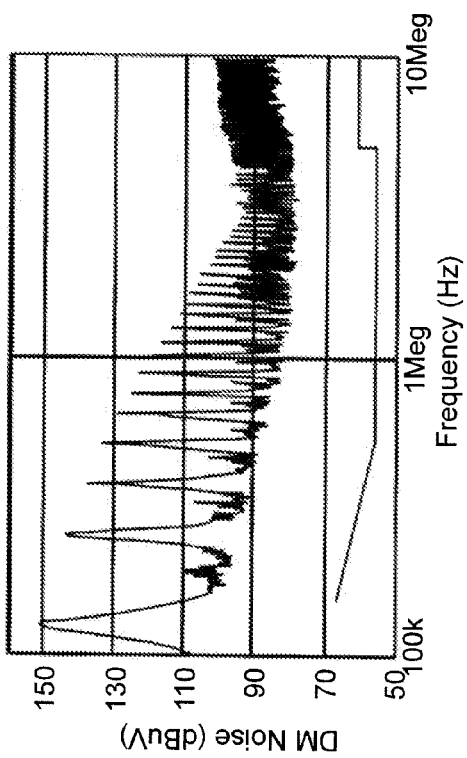
Figure 12D:
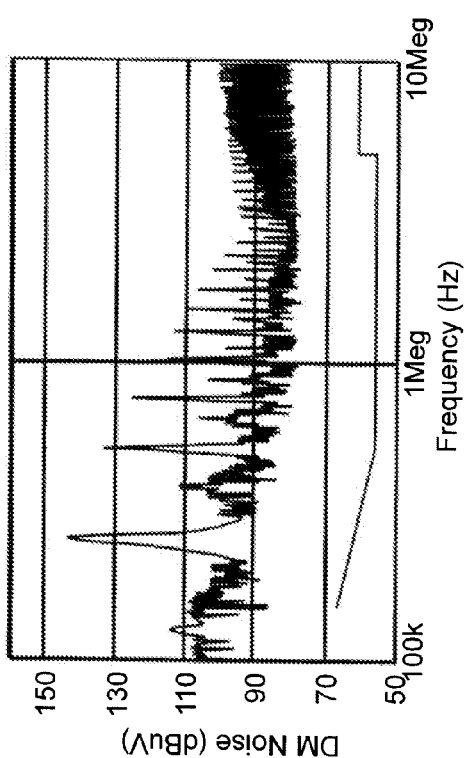

As alluded to above, it should also be appreciated that some ranges of corner frequency relative to switching frequency will provide a benefit in allowing reduction of EMI filter size and cost while others will not; thus constituting a significant limitation on the use of symmetrically interleaved multi-channel PFCs to provide a benefit in reducing size and cost of EMI filter design. That is, since the EMI noise can be predicted for 180° or, more generally, 360°/m symmetrical interleaving in a multi-channel PFC circuit running at different frequencies can be predicted based on the above EMI noise model as well as for single channel or non-interleaved PFC circuits, the relationship between the required filter corner frequency (assuming, for example, a two-stage EMI filter design) to suitably limit the magnitude of EMI noise as a function of the switching frequency can be obtained, as illustrated in FIG. 11 for DM and CM noise. The graphs illustrated show curves for single channel, two-channel, three-channel and four-channel PFC circuits. It should also be understood that EMI filtering standards are only concerned with noise at frequencies above, for example (and as reflected in this discussion and the corresponding drawings), 150 KHz. Thus the discontinuities illustrated in FIG. 11 correspond to points at which a noise peak is removed (e.g. as the switching frequency decreases) from the range of frequencies of interest and to which the EMI standard is applicable and less attenuation is tolerable for such lower frequencies below, in this case, 150 KHz. For the same reasons, the corner frequency required, for example, for single channel and two-channel PFC circuits is the same for certain switching frequency ranges such as 75 to 150 KHz since it is immaterial to the EMI filter design under the EMI noise standard whether the fundamental is canceled by the two-channel symmetrically interleaved arrangement or less attenuation is tolerable since the noise at the fundamental frequency is not of interest when the fundamental frequency (or other harmonic noise peak) is at a frequency below, in this case, 150 KHz under the EMI noise standard.

Thus, there are ranges of switching frequency such as between 75 KHz (where the second order harmonic is 150 KHz) and 150 KHz (where the fundamental is 150 KHz) where symmetrical interleaved two-phase switching provides no advantage in regard to EMI filter design. Other ranges where no advantage is provided occur at 37.5 KHz to 50 KHz, 25 KHz to 30 KHz and so on corresponding to switching frequency ranges where an odd-numbered harmonic is below 150 KHz while the next even-numbered harmonic is above 150 KHz. Conversely, there are no discontinuities where the (fundamental) switching frequency is above 150 KHz. Thus, a basic strategy for reduction of EMI filter design and cost where interleaving of multiple channels is symmetrical is to choose a number of channels for the PFC circuits such that the fundamental frequency or lowest order harmonic above 150 KHz is canceled and to choose a corner frequency for the EMI filter sufficiently below the next higher (non-canceled) noise peak to provide adequate attenuation. For example, for a switching frequency above 150 KHz, by interleaving two channels, the switching frequency noise is cancelled and the EMI filter can be designed based on the second order harmonic of the switching frequency. Because the noise magnitude is lower and the frequency is higher, the filter corner frequency can be increased (e.g. less attenuation is required for a lower noise peak magnitude and the offset of the corner frequency below the second harmonic can thus be proportionately less). Similarly, for a switching frequency range of 75 KHz to 150 KHz where a two-channel PFC arrangement provides no advantage but the switching frequency is below the frequency range or minimum frequency of interest, as discussed above, a single channel PFC arrangement can be employed and the EMI filter designed according to the second order harmonic and so on.

For three or more channels of symmetrically interleaved PFC circuits, the benefit to EMI filter design is also limited to certain switching frequency ranges but such frequency ranges can sometimes be avoided by alternative numbers of channels of PFC circuitry just as three or more channel PFC circuits can be used to avoid some ranges where two-channel symmetrical phase shift arrangements provide no benefit. However, such solutions may not be possible for some switching frequencies or practical for others due to the trade-off between number of channels and EMI filter size and cost, as alluded to above.

It should be noted that while multi-channel PFC arrangements using symmetrical phase shifts are known, it is unclear whether or not such arrangements have been exploited to reduce size and cost of EMI filters in the manner discussed above. Therefore, no admission is made or to be inferred from the knowledge of such arrangements that the above basic principle of PFC design as applied to symmetrical phase shift multi-channel PFC arrangements for purposes of reducing EMI filter design and cost is known of constitutes prior art in regard to the present invention, particularly in view of the severe limitation to particular frequency ranges which the invention seeks to avoid.

In other words, many current commercially available PFC products are designed to operate in the 75 KHz to 150 KHz range of switching frequencies where, as described above, a symmetrical 180° phase shift of two-channel interleaved PFC circuits (often used in such products) provides no benefit over a single channel PFC circuit since the second harmonic cannot be reduced by the former, as described above and illustrated in FIG. 12. However, in accordance with basic principles of the invention, other phase shifts between PFC channels which are not symmetrical can provide cancellation or partial cancellation effects where symmetrical phase shifts are ineffective to provide benefits in regard to EMI filter design for reduction of size and cost thereof.

Figure 13A:
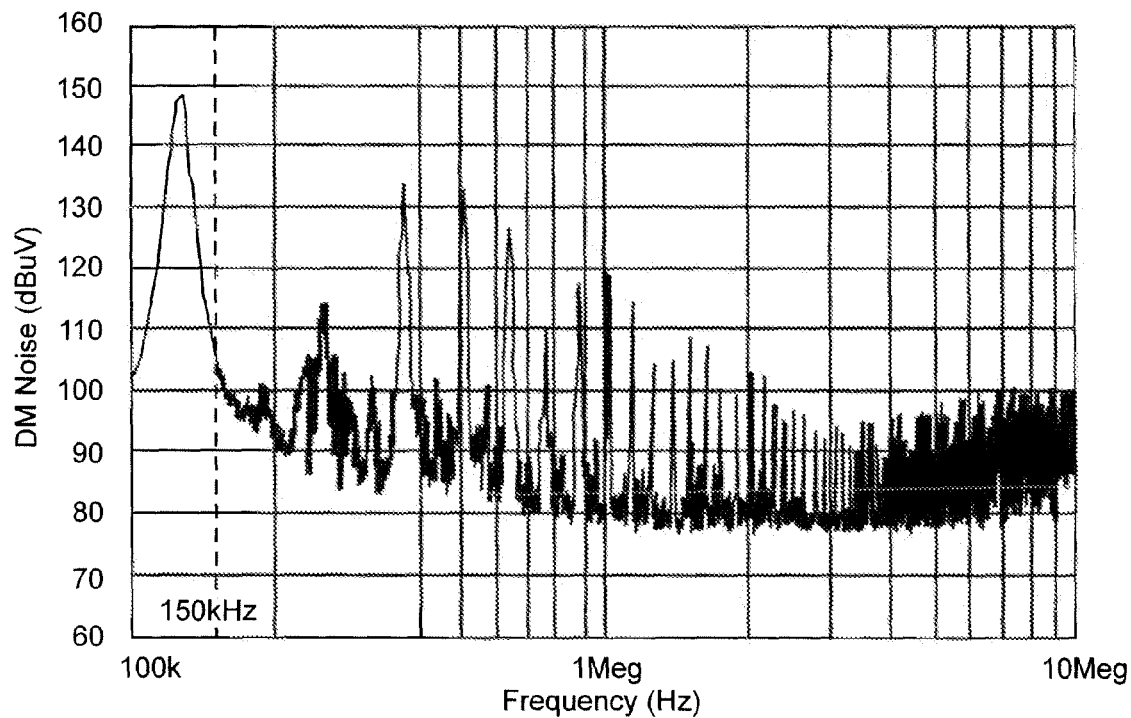
FIG. 13 illustrates a measured DM and CM noise for a two channel power converter with an asymmetrical 90° phase shift between channels, FIG. 14 graphically illustrates the relationship between DM filter (for example) corner frequency and switching frequency for asymmetrical and symmetrical phase shifts, FIG. 15 graphically illustrates the relationship between filter corner frequency and switching frequency of asymmetrical interleaving strategy for different switching frequency and increasing numbers of channels.
Figure 13B:
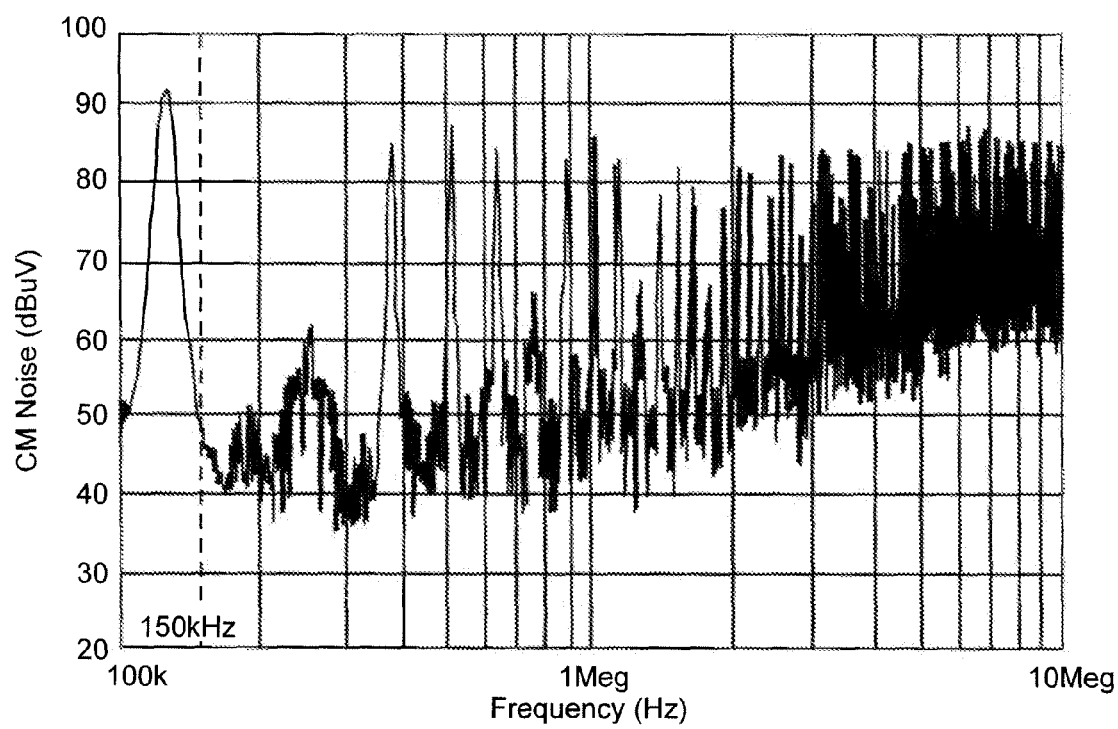
Figure 14:
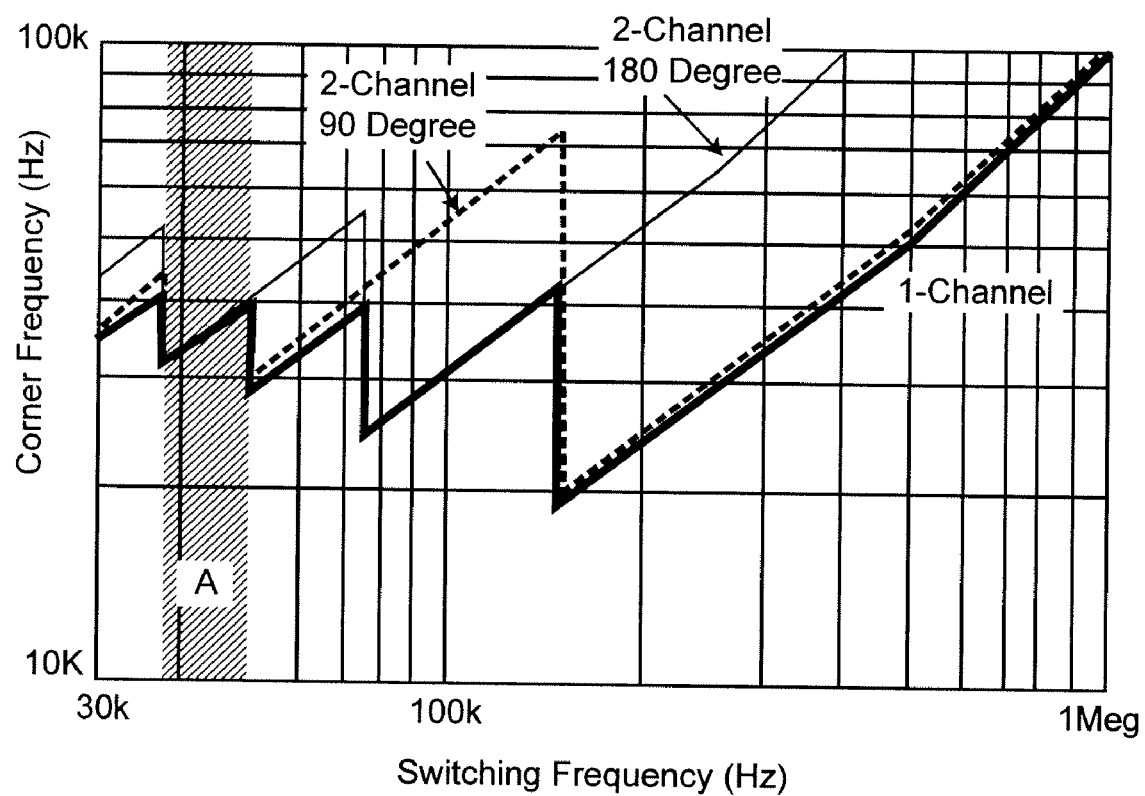

For example, in the 75 kHz to 150 kHz range of switching frequencies, a two-channel PFC operating with a 90° or 270° phase shift can cancel the second order harmonic and reduce the third order harmonic, allowing the EMI noise filter to be based on the reduced third order harmonic noise; allowing the filter size to be substantially reduced. The measured DM and CM EMI noise for a single channel PFC and a two-channel, 90° phase shift PFC (juxtaposed to facilitate comparison) are illustrated in FIG. 13. FIG. 14 illustrates the relationship of required EMI filter corner frequency to switching frequency similar to FIG. 11 and clearly indicates the benefit of asymmetrical phase shift (e.g. 90°) to EMI filter design (by allowing a higher corner frequency to be chosen) in the switching frequency range of 75 kHz to 150 kHz where a symmetrical phase shift would provide no benefit over a single channel PFC. However, it should be noted that a 90° phase shift provides no benefit over a single channel or symmetrical phase shift two-channel PFC for a switching frequency in the range of 37.5 to 50 kHz (region A in FIG. 14). If a switching frequency in such a range is desirable, the basic principles of the invention in regard to asymmetrical phase shift as described above, can be extended to allow benefit to EMI filter design through different amounts of phase shift.

For example, a 45° phase shift for a two-channel PFC can cancel the fourth order harmonic (the fundamental and second and third order harmonics being below 150 KHz) and reduce the fifth order harmonic; allowing the EMI filter to be based on the fifth order harmonic which is of reduced amplitude and allowing reduction of EMI filter size and cost as discussed above. This concept can be extended to even lower ranges of switching frequency to allow cancellation of the initial harmonic noise peak above 150 KHz and reduction of the following harmonic noise peak.

This asymmetrical phase shift interleaving strategy can also be extended to multi-channel PFC circuits to provide benefits to EMI filter design in frequency ranges where symmetrical phase shift interleaving is not effective to provide similar benefits. For example, symmetrical phase shift interleaving of a three-channel PFC circuit has no effect benefiting EMI filter design in the switching frequency range of 50 KHz to 75 KHz because symmetrical interleaving (e.g. 360°/3=120°) has no impact on the third order harmonic (e.g. the initial harmonic above 150 KHz for a switching frequency of 50 KHz to 75 KHz) and the EMI filter must thus be based on the full amplitude of the third order harmonic noise peak. Thus, as shown in FIG. 11, the required corner frequency for a three-channel interleaved PFC circuit with symmetrical phase shift is the same as that for single channel and lower than that for a two-channel symmetrical phase shift PFC arrangements from 50 KHz to 75 KHz switching frequency.

Figure 15A:
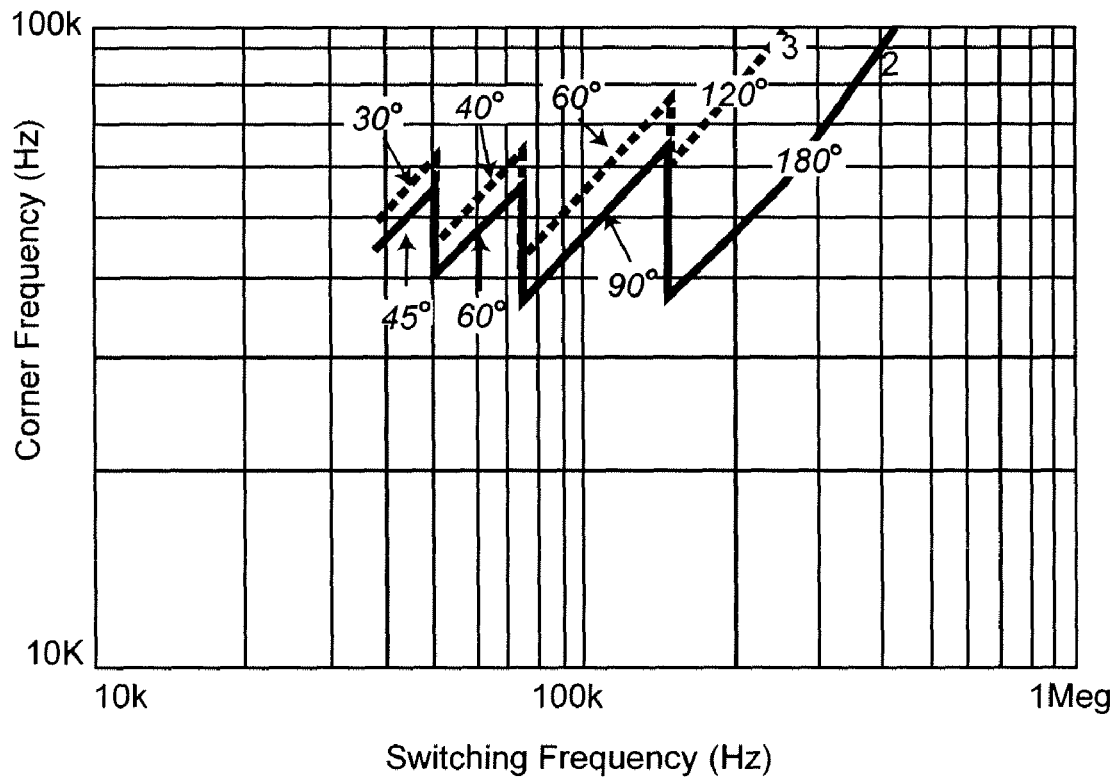
Figure 15B:
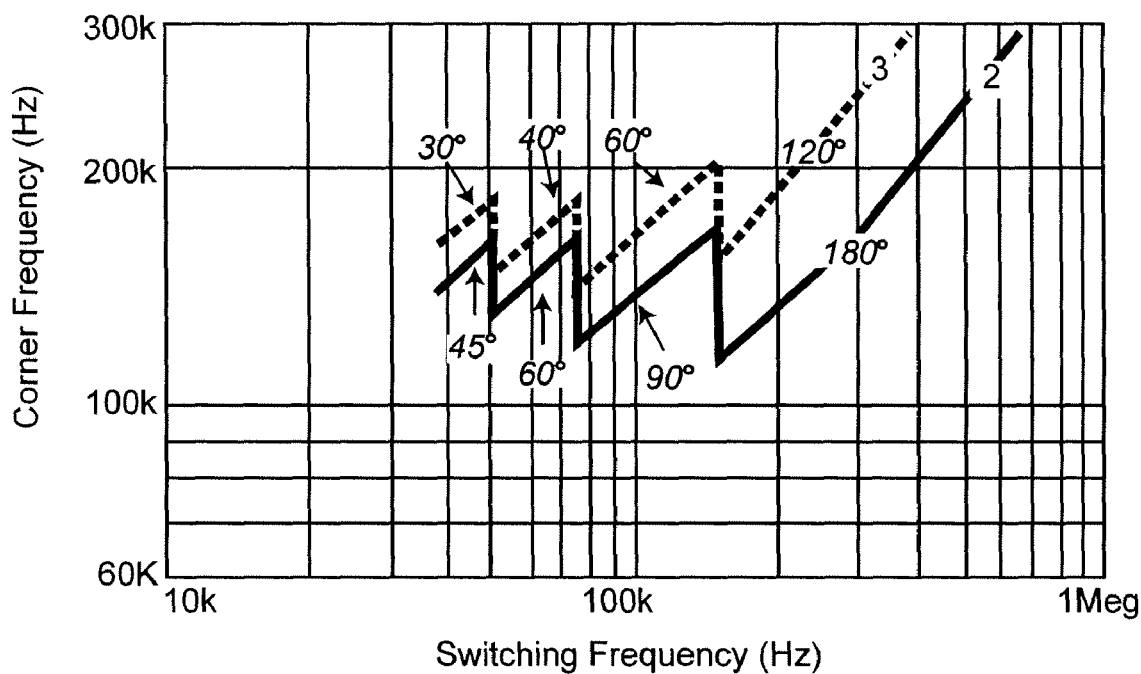

However, a 40° (or 80°, 280° or 320°) phase shift scheme can be used in a three-channel PFC circuit to cancel the third order harmonic noise peak and reduce the fourth order harmonic noise peak. This multi-channel interleaving with asymmetrical phase shift can be extended to any number of channels of PFC circuit and further extended to lower frequency ranges with smaller asymmetrical phase shifts to cancel the initial harmonic noise peak above 150 KHz and reduce the next higher order noise peak on which the EMI filter design may thus be based. The EMI filter corner frequency of the asymmetrical interleaving method is summarized in FIG. 15, for two-channel and three-channel PFC circuits, for example. Compared with the symmetrical interleaving method illustrated in FIG. 11, an asymmetrical interleaving strategy can significantly reduce EMI filter size and cost.

In the above interleaving and phase shift strategies for increasing the EMI corner frequency which allows the EMI filter size and cost to be reduced, the interleaving and phase shift sought to cancel the fundamental or initial harmonic noise peak above the lowest frequency of interest in the applicable EMI standard. However, from the EMI filter point of view, canceling a certain fundamental or harmonic noise peak is not necessarily optimal, particularly at high switching frequencies where the fundamental frequency is above the minimum frequency of interest in a given EMI standard and thus the fundamental frequency and second order harmonic frequency will be necessarily separated by an octave. In such a case, the difference in attenuation for the two frequencies will differ by some multiple of 6 dB, depending on the filter topology, simplifying the calculation of optimum asymmetric phase shift between channels of a PFC circuit.

Figure 16:
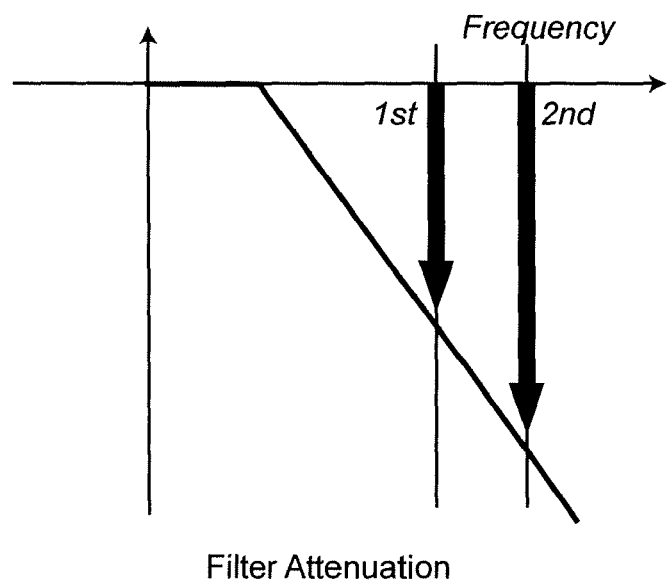
FIG. 16 is an idealized filter attenuation curve helpful for visualizing the meritorious effects of the invention.

For example, if the switching frequency is 200 KHz, and the EMI filter is designed to provide suitable noise attenuation of, for example, 85 dB or more at the second order harmonic frequency (e.g. 400 KHz), the filter of any given design having a filter characteristic such that attenuation increases at a given rate per octave or decade above a nominal corner frequency will still provide significant attenuation at the fundamental frequency (e.g. one octave below the second order harmonic) as shown in FIG. 16. Therefore, to fully exploit the principles of the present invention, it is desirable to arrange an asymmetrical phase shift such that the initial noise peak of interest under the EMI standard is less than fully canceled so that the next higher order harmonic noise peak can be partially canceled, as well in order to allow maximum increase in the required corner frequency. The optimal phase shift can be readily calculated by determining the relative amounts of attenuation of two harmonically related adjacent frequencies and setting the relative amounts of cancellation to be complementary to the attenuation of the filter characteristic for a given filter topology (e.g. single stage or two-stage filter) and the requirements of any applicable EMI standard which may have different requirements at different frequencies. The optimal phase shift angle can thus be identified for any number of channels of the PFC circuit operating at any given switching frequency.

For the PFC circuit, high light load efficiency is becoming more and more demanded in recently years. With the multi-channel structure, shut down of some channels to improve the efficiency at light load condition would be a very natural solution. However, due to the EMI requirement, the EMI filter needs to handle the worst case EMI noise, which would be encountered with fewer channels to interleave at light load. Thus, the benefit on filter size reduction from multi-channel interleaving may be lost as is particularly evident from the fact that the phase shift which produces noise peak cancellation or amplitude reduction as described above is necessarily linked to the number of channels which are interleaved as well as the switching frequency.

Figure 17:
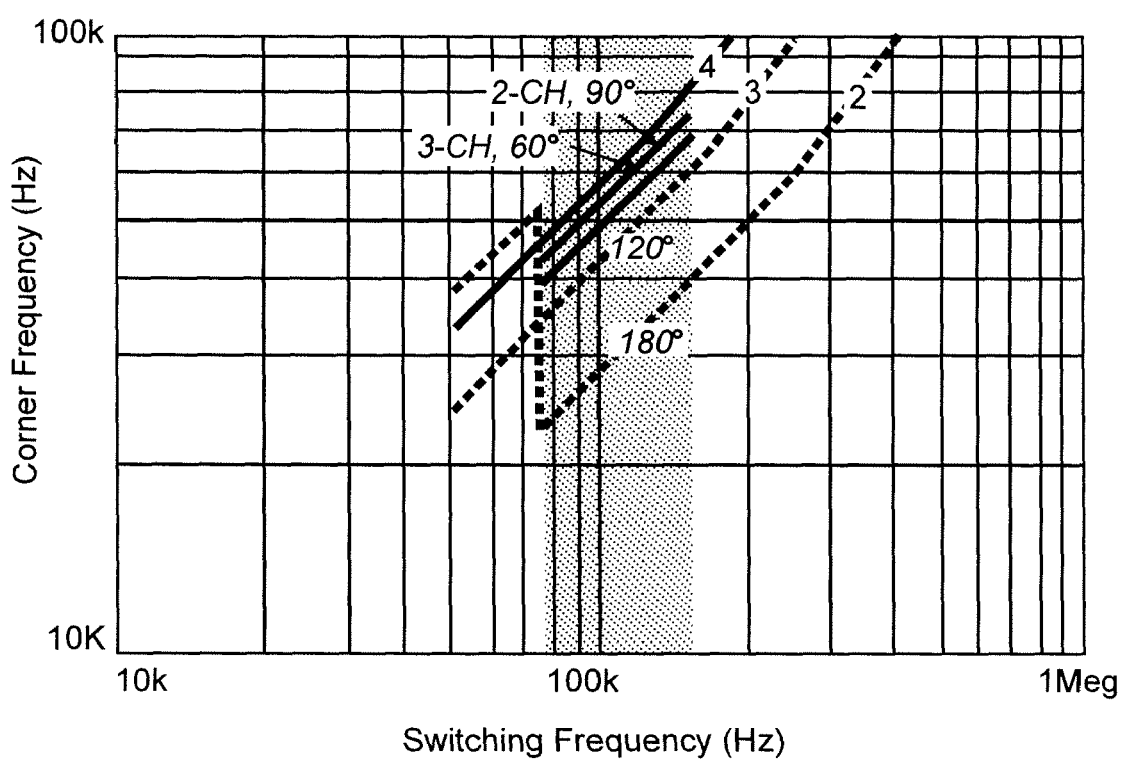
FIG. 17 is the DM filter (for example) corner frequency and the switching frequency for adaptive interleaving control.

Based on the asymmetrical interleaving concept, adaptive control the phase shift angles between the PFC channels can be used to improve the light load efficiency without suffering a need to increase the EMI filter size to accommodate worst-case circumstances. For example, considering a four-channel interleaved PFC and assuming the switching frequency is chosen in the range of 75 KHz to 150 KHz, which is a popular switching frequency design range for today's industry products, at full load condition, all four channels are operating with 90° phase shift. At light load condition, one channel can be shut down and the three remaining channels can be made to operate with 60° phase shift to keep high efficiency and high filter corner frequency. When the load becomes even lighter, one more channel can be shut down and the two remaining channels made to operate with 90° phase shift. This concept is illustrated in FIG. 17. (The curves are different from FIG. 11 and FIG. 15, because the PFC total power is changing with channel numbers for this case). The EMI filter will be designed based on the worst case EMI noise which is 2-channel 90° phase shift operation. The difference in corner frequency required for two-channel, three-channel and four-channel PFC circuits is significantly reduced particularly compared with symmetrical phase shifts illustrated with dashed lines in FIG. 17.

Of course, phase control must be implemented, preferably digitally, to realize the adaptive channel management and change of phase shift as the number of channels is changed. For example, since the power switches are controlled by a pulse width modulated (PWM) for most digital controllers and in this adaptive application of the invention, the number of operating channels is determined by load conditions, the phase shift between channels can be controlled in accordance with the number of operating channels through the PWM module using a look-up table for the preferred combinations of number of operating channels and corresponding phase shifts to maintain the EMI noise within the corner frequency of the EMI filter which may still be increased in accordance with the invention as compared with the prior art. Other suitable arrangements for changing phase shift to correspond to variable numbers of operating channels will be apparent to those skilled in the art. Further, the optimal phase shift concept described above in connection with FIG. 16 also can be combined with this adaptive phase shift angle control method.

In view of the foregoing, it is seen that the invention provides a strategy for design of a PFC circuit having two or more channels and which has a phase shift between channels which allows an optimally high corner frequency to be chosen for an EMI filter for any desired PFC circuit switching frequency. While a symmetrical phase shift between channels is not effective to provide benefits to EMI filter design for all switching frequency ranges, a similar benefit can be derived by use of asymmetrical phase shifts in such ranges. Substantial increases in the required corner frequency of an EMI filter (allowing the use of smaller and less costly components) can be achieved by selecting a phase shift which causes the fundamental or initial harmonic above the lowest EMI noise frequency of interest to be canceled and the next higher order harmonic noise peak to be reduced whereby an EMI filter corner frequency may be chosen based on the frequency of the next higher order harmonic. Asymmetrical phase shifts can be optimized to allow the highest possible corner frequency to be chosen for the EMI filter wherein the first two noise peaks above the minimum EMI frequency of interest (e.g. under a given EMI standard) are each partially canceled in a proportion which is complementary to the EMI filter characteristic.

While the invention has been described in terms of a single preferred embodiment, those skilled in the art will recognize that the invention can be practiced with modification within the spirit and scope of the appended claims.

We claim:

1. A method of determining parameters of a power factor correction circuit to allow an EMI filter for said power factor correction circuit to have an increased corner frequency, said method comprising steps of
    determining a minimum noise frequency of interest,
    determining a switching frequency of said power factor correction circuit, said power factor correction circuit having at least m channels, where m is equal to two or more, operated in an interleaved manner in which switching times in respective channels of said power factor correction circuit are separated by a phase shift,
    selecting a phase shift other than 360°/m such that a fundamental frequency or initial harmonic having a frequency above said minimum noise frequency of interest is at least partially canceled, and
    selecting a corner frequency of an EMI filter based on a next higher order harmonic frequency above said fundamental frequency or initial harmonic having a frequency above said minimum noise frequency of interest.

2. The method as recited in claim 1, wherein said phase shift is selected to cancel a noise peak above said minimum noise frequency of interest.

3. The method as recited in claim 1, wherein said phase shift is selected to cause partial cancellation of two noise peaks above said minimum frequency of interest.

4. The method as recited in claim 3, wherein said partial cancellation of said two noise peaks is respectively complementary to a filter function of said EMI filter.

5. The method as recited in claim 4, wherein said two noise peaks are adjacent to each other in a noise spectrum of said power factor correction circuit.

6. The method as recited in claim 3, wherein said two noise peaks are adjacent to each other in a noise spectrum of said power factor correction circuit.

7. The method as recited in claim 6 including further steps of
    at light load, reducing a number of said channels to a number less than m where m is equal to or greater than three, and
    altering said phase shift to correspond to said number of channels less than m.

8. The method as recited in claim 3 including further steps of
    at light load, reducing a number of said channels to a number less than m where m is equal to or greater than three, and
    altering said phase shift to correspond to said number of channels less than m.

9. The method as recited in claim 1 including further steps of
    at light load, reducing a number of said channels to a number less than m where m is equal to or greater than three, and
    altering said phase shift to correspond to said number of channels less than m.

10. A power converter circuit including
    a multi-channel power factor correction circuit having m power factor correction circuit modules connected in parallel as respective channels thereof, respective channels of said power factor correction circuit including switching means which are switched with a relative phase shift other than 360°/m such that a fundamental frequency or initial harmonic of switching noise above a frequency of interest is at least partially canceled, and
    an electromagnetic interference (EMI) filter having a corner frequency chosen based upon a harmonic of said switching noise having a frequency above said a fundamental frequency or initial harmonic of switching noise above a frequency of interest.

11. The power converter as recited in claim 10, wherein said phase shift is such that said fundamental frequency or initial harmonic of switching noise above a frequency of interest is cancelled.

12. The power converter as recited in claim 10, wherein said phase shift is such that said fundamental frequency or initial harmonic of switching noise above a frequency of interest and a next higher harmonic of switching noise are each partially cancelled.

13. The power converter as recited in claim 12 wherein said phase shift is such that said fundamental frequency or initial harmonic of switching noise above a frequency of interest and a next higher harmonic of switching noise are cancelled in a proportion complementary to a filter function of said EMI filter.

14. The power converter as recited in claim 10 wherein m is equal to three of more and wherein said power converter includes
    means for reducing the number of operating channels to a number less than m, and
    means for altering said phase shift in accordance with said number less than m.

* * * * *